R. J. WALTHER.
GAS MIXER.
APPLICATION FILED DEC. 28, 1911.
1,026,135.
Patented May 14, 1912.
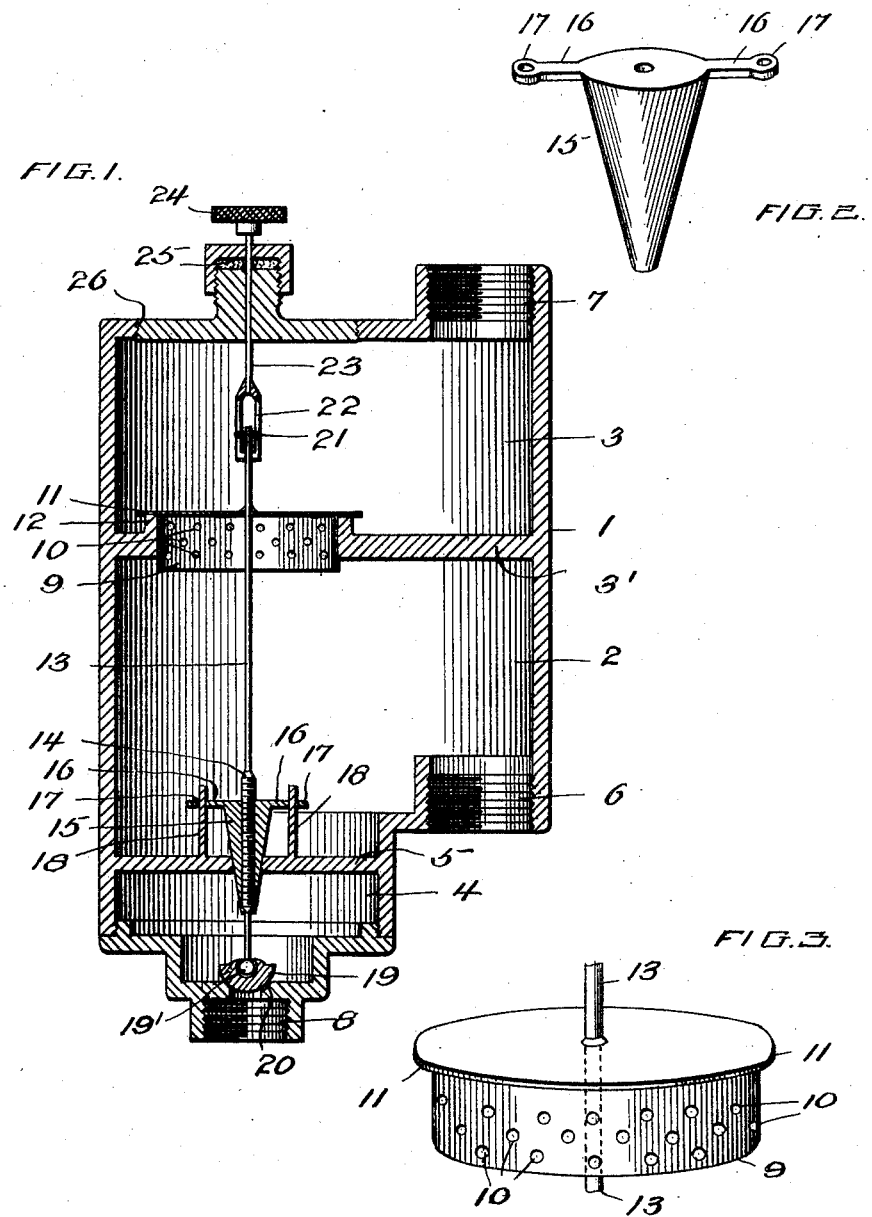
WITNESSES:
INVENTOR
Rudolph J. Walther.
BY
Attorney

UNITED STATES PATENT OFFICE.

RUDOLPH J. WALTHER, OF DAVENPORT, IOWA.

GAS-MIXER.

1,026,135.  Specification of Letters Patent.  Patented May 14, 1912.

Application filed December 28, 1911. Serial No. 668,363.

*To all whom it may concern:*

Be it known that I, RUDOLPH J. WALTHER, a citizen of the United States, residing at Davenport, in the county of Scott and State of Iowa, have invented certain new and useful Improvements in Gas-Mixers, of which the following is a specification.

This invention relates to regulating valves for gas lighting tanks and my object is to produce a series of valves of this character, whereby a high pressure of gas in a storage tank shall be mixed with air to a required degree of richness in a lighting system for a house, car or otherwise as may be required.

With these general objects in view and others as hereinafter appears, the invention comprises certain novel and peculiar features of construction and organization as hereinafter described and claimed; and in order that it may be fully understood, reference is to be had to the following drawings, in which—

Figure 1 is a longitudinal central vertical section of a gas mixer embodying my invention, Fig. 2 is a detail perspective view of the cone valve and Fig. 3 is a detail perspective view of the drum.

Like reference characters refer to like parts in all the drawings.

In the drawings, 1 is a casing divided into three chambers 2, 3, and 4 by horizontal diaphragms 3' and 5. A gas inlet 6 opening into chamber 2 admits gas from the reservoir not shown in the drawings and a gas take off connection 7 leads from chamber 3 of the casing; 8 is an air inlet connection, 9 is a movable bell rigidly attached to valve stem 13 and fitted to a seat 12 in the partition 3' said bell having perforations 10 in its cylindrical wall and a cover 11 with a projecting flange adapted to rest normally upon the seat 12. The valve stem 13 is formed with the threaded core 14 and engages the cone valve 15 in the line of its longitudinal axis. Arms 16 on said cone valve provided with guiding apertures 17 slide upon vertical guide rods 18 to prevent this valve from turning with the core when the latter is revolved under impulse from the stem 13. A valve disk 19 resting normally in a valve seat 20 is so connected with the threaded core 14 that any vertical displacement of the valve stem 13 is communicated to it. Between the valve disk 19 and the stem 13 a ball and socket joint is provided to permit a slight rocking movement of said valve disk for the perfect closing of said valve. The ball 19' is loosely inclosed in a depression in said disk corresponding to the form and size of the ball. The valve stem 13 may be turned on its axis by means of a milled adjusting stem 24 secured to the auxiliary stem 23 passing through the stuffing box 25 and integral with the swivel 22, through which swivel free vertical movement is permitted of the stem 13 as yoke 22 is turned in contact with pin 21 passing transversely through the end of stem 13. The stuffing box 25 is shown as having threaded connection with the casing 1 at 26 for convenience in assembling and inspecting. The casing 1 is in the form of a vertical cylinder provided at its lower extremity with inlet openings for gas and air respectively and at its upper extremity provided with a mixture outlet and a controlling device.

The operation of the gas mixer is as follows: The device having been properly connected to the respective inlet and outlet connections, gas flows into chamber 2, lifting the bell 9 to an extent contingent upon the number of lights in use and the consequent outward flow of the gas. It will be seen that there will be no flow of gas through the bell when no gas is in use. As the bell 9 is lifted in its seat 12, a flow of gas proceeds through the first row of perforations 10 and the valve stem 13 rigidly secured to the bell tends to raise the cone valve 15 opening into the air chamber 4 and simultaneously therewith to raise the valve disk 19 leading to the outer air. The draft of the mixture being in the direction of the mixture outlet 7, no gas will flow out through the cone valve but air flows in through the valve seat 20 and is mixed with the gas in passing through the perforations 10 of the bell into chamber 3. The proportion of air introduced into the mixture is controlled by the milled adjusting stem 24 and by means of this the threaded core 14 integral with the valve stem 13 and engaging the cone valve 15, may be so raised or lowered as to admit any desired amount of air to the chamber 2. The milled adjusting stem 24 is rigidly attached to the auxiliary valve stem 23 which passes through the stuffing box 25 and terminates in a yoke 22, through which is passed valve stem 13 in alinement with stem 23. By means of the pin 21 passing transversely through the upwardly disposed end of stem 13 projecting within the yoke 22, rotation of stem 13 may be accomplished through milled adjusting stem 24 raising or lowering valve stem 13 with reference to cone valve 15 by the vertical displacement of the threaded core 14. While bell 9 may be raised to a given extent by a certain flow of gas, the air to be mixed with the gas would be under complete control of the operator and while the bell turns in its seat 12 it will not be raised or lowered by other pressure than the flow of gas as valve stem 13 may move upward or downward in yoke 22 to accommodate itself to that flow. However any movement of valve stem 13 is communicated to cone valve 15 as the stem 13 is rigid with the bell and the requisite spacing apart of bell and cone valve is under control of the milled adjusting stem 24 as it turns core 14 threaded into said cone valve. The valve disk 19 is also actuated by the rotation of valve stem 13 and when closed as it normally is, prevents the flow of gas into the connections and the undesirable filling of the pipes with air. The vertical guide rods 18 prevent the rotation of the cone valve on its longitudinal axis at the time of the rotation of the core 14.

Having thus fully described my invention, what I claim is—

1. A gas mixer comprising an outer shell, a plurality of transverse partitions within said shell provided with apertures, gas and air inlet connections at one end thereof, a mixture outlet at the opposite end of said shell, a bell having a series of perforations in its cylindrical wall fitted to the aperture in the partition adjacent to the mixture outlet and opening in the direction of the flow of gas, a cone valve opening inwardly away from the air connection, a valve stem centrally secured to the cone and the bell, guides in slidable coöperation with the cone valve to maintain said valve in alinement with said stem and bell and means for adjusting the distance between said cone and said bell for regulating the admission of air through the air inlet.

2. A gas mixer comprising an outer shell, a plurality of transverse partitions within said shell provided with apertures, gas and air inlet connections at one end thereof, a mixture outlet at the opposite end of said shell, a bell having a series of perforations in its cylindrical wall fitted to the aperture in the partition adjacent to the mixture outlet and opening in the direction of the flow of gas, a cone valve opening inwardly away from the air connection, a valve stem centrally secured to the cone and the bell, a valve disk in alinement with the cone valve and disposed away from same in the direction of the external air, a ball bearing in said valve disk, an upwardly projecting rod threaded into the cone valve and passing centrally through the bell, a milled adjusting rod entering the shell above the bell and engaging the upwardly projecting end of said rod to alter the distance between the cone valve and said bell.

In testimony whereof, I have hereunto affixed my signature in the presence of two witnesses.

RUDOLPH J. WALTHER.

Witnesses:
W. E. ROESKE,
ARTHUR NEHLSEN.

---

Copies of this patent may be obtained for five cents each, by addressing the "Commissioner of Patents, Washington, D. C."